United States Patent
Wey et al.

(10) Patent No.: US 7,309,964 B2
(45) Date of Patent: Dec. 18, 2007

(54) FLOATING DRIVE CIRCUIT FOR COLD CATHODE FLUORESCENT LAMP

(75) Inventors: Chin-Der Wey, Houlong Township, Miaoli County (TW); Kuei-Lin Chen, Taipei (TW); Chia-Hung Sun, Kaohsiung (TW); Hsien-Jen Li, Hemei Township, Changhua County (TW)

(73) Assignee: AU Optronics Corporation, Hsinchu (TW)

( * ) Notice: Subject to any disclaimer, the term of this patent is extended or adjusted under 35 U.S.C. 154(b) by 105 days.

(21) Appl. No.: 10/956,812

(22) Filed: Oct. 1, 2004

(65) Prior Publication Data
US 2006/0071615 A1 Apr. 6, 2006

(51) Int. Cl.
*H05B 37/00* (2006.01)
(52) U.S. Cl. ............... 315/312; 315/276; 315/291
(58) Field of Classification Search ......... 315/291, 315/312, 277
See application file for complete search history.

(56) References Cited

U.S. PATENT DOCUMENTS

| | | | |
|---|---|---|---|
| 5,886,477 A | 3/1999 | Honbo et al. | 315/209 PZ |
| 6,130,509 A | 10/2000 | Kates et al. | 315/224 |
| 6,380,695 B1 | 4/2002 | Lin et al. | 315/291 |
| 6,534,927 B1 | 3/2003 | Takaoka | 315/224 |
| 6,534,934 B1 | 3/2003 | Lin et al. | 315/312 |
| 6,566,821 B2 * | 5/2003 | Nakatsuka et al. | 315/209 PZ |
| 6,593,707 B1 | 7/2003 | Shih | |
| 6,661,181 B2 * | 12/2003 | Shin | 315/169.4 |
| 6,717,372 B2 * | 4/2004 | Lin et al. | 315/282 |
| 6,781,325 B2 * | 8/2004 | Lee | 315/282 |
| 7,042,171 B1 * | 5/2006 | Lin | 315/291 |
| 2002/0047601 A1 | 4/2002 | Shannon et al. | 315/224 |
| 2003/0001524 A1 | 1/2003 | Lin et al. | 315/312 |
| 2003/0141829 A1 | 7/2003 | Yu et al. | 315/276 |
| 2005/0017658 A1 * | 1/2005 | Chien et al. | 315/276 |
| 2005/0023988 A1 * | 2/2005 | Komatsu et al. | 315/224 |
| 2005/0062436 A1 * | 3/2005 | Jin | 315/244 |
| 2005/0088113 A1 * | 4/2005 | Ushijima et al. | 315/276 |
| 2005/0099143 A1 * | 5/2005 | Kohno | 315/312 |
| 2005/0146291 A1 * | 7/2005 | Lee | 315/308 |
| 2005/0156542 A1 * | 7/2005 | Lin | 315/312 |
| 2005/0218827 A1 * | 10/2005 | Ushijima et al. | 315/224 |
| 2005/0242738 A1 * | 11/2005 | Lyle et al. | 315/10 |
| 2006/0097666 A1 * | 5/2006 | Venkitasubrahmanian et al. | 315/312 |
| 2006/0273745 A1 * | 12/2006 | Wey et al. | 315/312 |
| 2007/0007910 A1 * | 1/2007 | Kim et al. | 315/282 |

FOREIGN PATENT DOCUMENTS

| | | |
|---|---|---|
| JP | 2004 241266 | 8/2004 |
| WO | WO 9415444 | 7/1994 |

* cited by examiner

*Primary Examiner*—Trinh Vo Dinh
(74) *Attorney, Agent, or Firm*—Duane Morris, LLP

(57) ABSTRACT

A floating driving device for illumination includes a illumination unit having a first terminal and a second terminal. A first driver is electrically coupled to the first terminal of the illumination unit, for applying AC voltages to the first terminal. A second driver is electrically coupled to the second terminal of the illumination unit, for applying AC voltages to the second terminal in such a manner that the AC voltages at the first terminal and the second terminal are out of phase.

19 Claims, 8 Drawing Sheets

FLOATING DRIVE CIRCUIT FOR COLD CATHODE FLUORESCENT LAMP

BACKGROUND

This invention relates to a flat-panel display device. More particularly, the invention relates to a cold cathode fluorescent lamp (CCFL) backlight device used in conjunction with a liquid crystal display (LCD).

Liquid crystal displays (LCD's) used in televisions, computers and other video display devices produce predetermined images and control light transmission to produce video displays. LCD's are particularly suited for flat panel displays because of their superiority in resolution, color image display, and image quality. LCD's do not emit light themselves and therefore utilize backlight devices behind the LCD panel to produce a visible video display. Cold cathode fluorescent lamps (CCFL's) have been used for various illumination purposes and are particularly suited for use as backlight apparatuses for liquid crystal displays, such as TFT-LCD's (Thin Film Transistor-Liquid Crystal Displays) in televisions, computers, and other video display technologies. The performance and quality of the video display is optimized when the illumination is sufficient and uniform throughout the display. Non-uniform illumination degrades the quality of the displayed image. Technological advances in the video display industry enable the production of increasingly larger LCD's and other video displays, and as such video display devices become larger, it becomes increasingly more challenging and important to provide a uniformly illuminated display device. In particular, as larger video displays are produced, it becomes more challenging and important to provide a CCFL backlight apparatus that produces uniform illumination.

Conventional CCFL's that are disposed behind LCD panels typically have one terminal coupled to and driven (i.e. illuminated) by a transformer and an opposed terminal coupled to ground. FIG. 1 shows a conventional CCFL driving device according to the prior art. FIG. 1 shows CCFL 1 having a first terminal 9 coupled to transformer 7 and opposed terminal 11 coupled to ground 13. Transformer 7 drives CCFL 1 by providing a high voltage signal to terminal 9. CCFL 1 has length 3 and as length 3 increases along with the demands of advancing technology to provide larger video displays, a voltage drop occurs across the length 3 of CCFL 1. More particularly, as length 3 increases, a thermometer effect causes the high voltage applied at terminal 9 to be dissipated and a lower voltage to result in the portion of CCFL 1 closest to end 15 and by grounded opposed terminal 11. This results in uneven lighting. In fact, a shortcoming of a CCFL driven using the conventional arrangement shown in FIG. 1, is that the voltage drop may result in the effectuation of an inadequately illuminated dark region 5. In particular, it has been found that, when length 3 is about 30 inches or longer, a dark region such as dark region 5 routinely results.

It would be therefore desirable to produce a CCFL that provides uniform illumination, even as the size of the CCFL increases.

SUMMARY

In view of the foregoing, the following provides a floating driving device for illumination, including a illumination unit having a first terminal and a second terminal. A first driver is electrically coupled to the first terminal of the illumination unit, for applying AC voltages to the first terminal. A second driver is electrically coupled to the second terminal of the illumination unit, for applying AC voltages to the second terminal in such a manner that the AC voltages at the first terminal and the second terminal are out of phase.

The construction and method of operation of the invention, however, together with additional objects and advantages thereof will be best understood from the following description of specific embodiments when read in connection with the accompanying drawings.

DESCRIPTION

The invention overcomes the shortcomings of the conventional art and provides a floating driving circuit for a CCFL or a plurality of CCFL's connected in parallel. Two opposite terminals of a CCFL are applied with AC voltages that are out of phase. In this manner, a high potential difference is maintained along the entire length of the CCFL regardless of the length of the CCFL, and a uniform intensity of illumination is produced throughout the length of the CCFL. One or more transformers may be used to provide the two terminals of a CCFL with such AC voltages. More than one CCFL may be coupled together in order to achieve a compact arrangement. A balance circuit may be used to provide CCFL's with balanced outputs. A novel design of the balance circuit is also proposed to realize the objective of having the terminals of a plurality of CCFL's driven by balanced voltages.

Figure 2A:
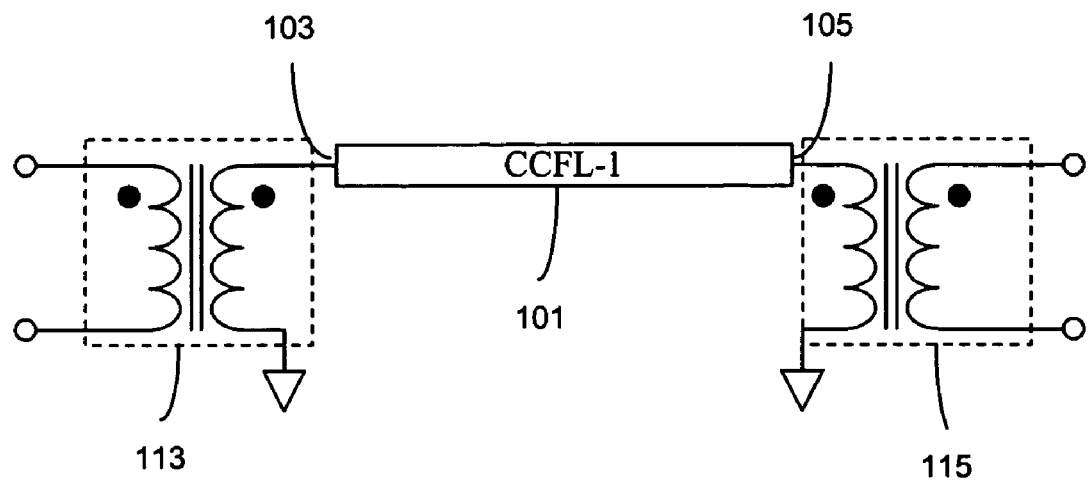
FIGS. 2A through 2D illustrate various CCFL floating driving devices, in accordance with one embodiment of the present invention.

FIG. 2A shows a CCFL floating driving device, according to one embodiment of the invention. CCFL 101 can be any type, shape and size of cold cathode fluorescent lamp commercially available. CCFL 101 includes opposed terminals 103 and 105 which are provided at the opposed ends of CCFL 101 and driven by different power driving devices. Terminal 103 is coupled to and driven by transformer 113 and opposed terminal 105 is coupled to and driven by transformer 115. Transformers 113 and 115 are each shown to include two windings, but other transformers or other power driving devices may also be used in this embodiments. For example, the transformers may include an iron or steel core surrounded by a coil. Because separate transformers 113, 115 are used at the opposed terminals of CCFL 101, they may be disposed on separate circuit boards and in close proximity to their corresponding terminals 103, 105 of CCFL 101.

Transformers 113 and 115 drive CCFL 101, i.e., cause CCFL 101 to produce light. In this embodiment, transformers 113 and 115 drive corresponding opposed terminals 103 and 105 of CCFL 101 with the same voltage AC waveform (i.e. same magnitude and frequency), but out of phase from each other. For example, the drive signals provided by respective transformers 113 and 115 may be of the same magnitude and frequency but completely out of phase with one another, i.e., 180° out of phase. This phase difference creates a voltage difference between the terminals 103 and 105, whereby driving CCFL 101 to illuminate. In addition, since the two terminals 103 and 105 are both driven by AC voltages, the thermometer effect that causes a dark end of a lengthy CCFL is eliminated.

Figure 2B:
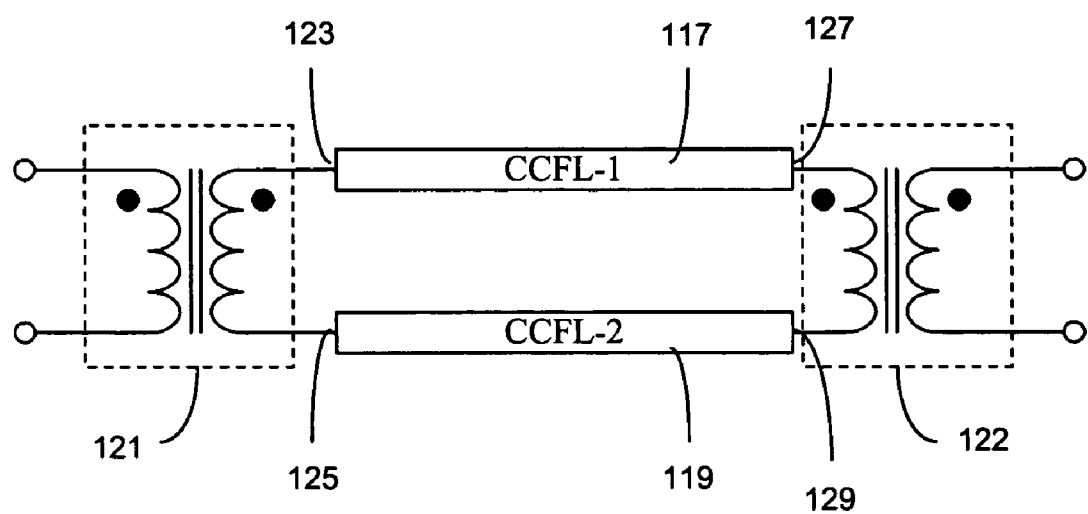

FIG. 2B illustrates an alternative CCFL floating driving device according to the above embodiment of the invention. Here, two CCFL's 117, 119 are coupled between two transformers 121, 122. The transformer 121 applies an AC voltage to terminal 123 of CCFL 117, and to terminal 125 of CCFL 119. Likewise, the transformer 122 applies an AC voltage to terminal 127 of CCFL 117, and to terminal 129 of CCFL 119. The AC voltages generated by the transformers 121 and 122 may be of the same magnitude and frequency, but differ in phase. For example, the two AC voltages may be 180 degrees out of phase. For the same reason discussed, CCFL's 117, 119 are better immune to the thermometer effect. Because two CCFL's 117, 119 are coupled between two transformers 121, 122, this arrangement may produce brighter illumination than the arrangement shown in FIG. 2A does.

Figure 2C:
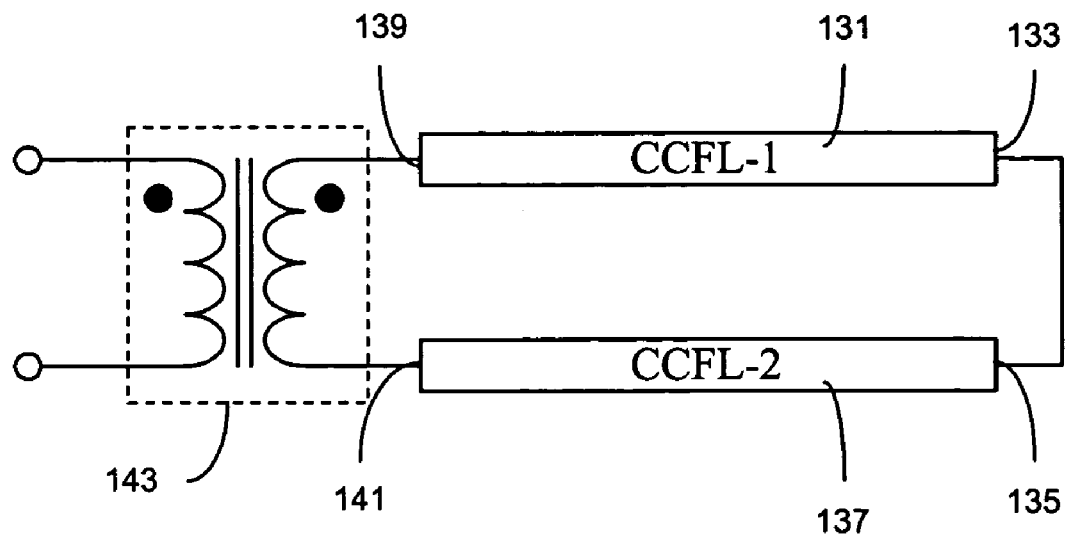

FIG. 2C illustrates another alternative CCFL floating driving device according to this embodiment of the invention. CCFL 131 has its terminal 133 connected to terminal 135 of CCFL 137. Terminal 139 of CCFL 131 and terminal 141 of CCFL 137 are connected to transformer 143, which applies AC voltages to these two terminals. As discussed above, the AC voltages may be of the same magnitude and frequency, but differ in phase. As such, CCFL's 131, 137 are better immune to the thermometer effect. Because two CCFL's 131, 137 are arranged in a U-shape configuration, one transformer 143 is able to drive them both, and this arrangement is therefore compact.

Figure 2D:
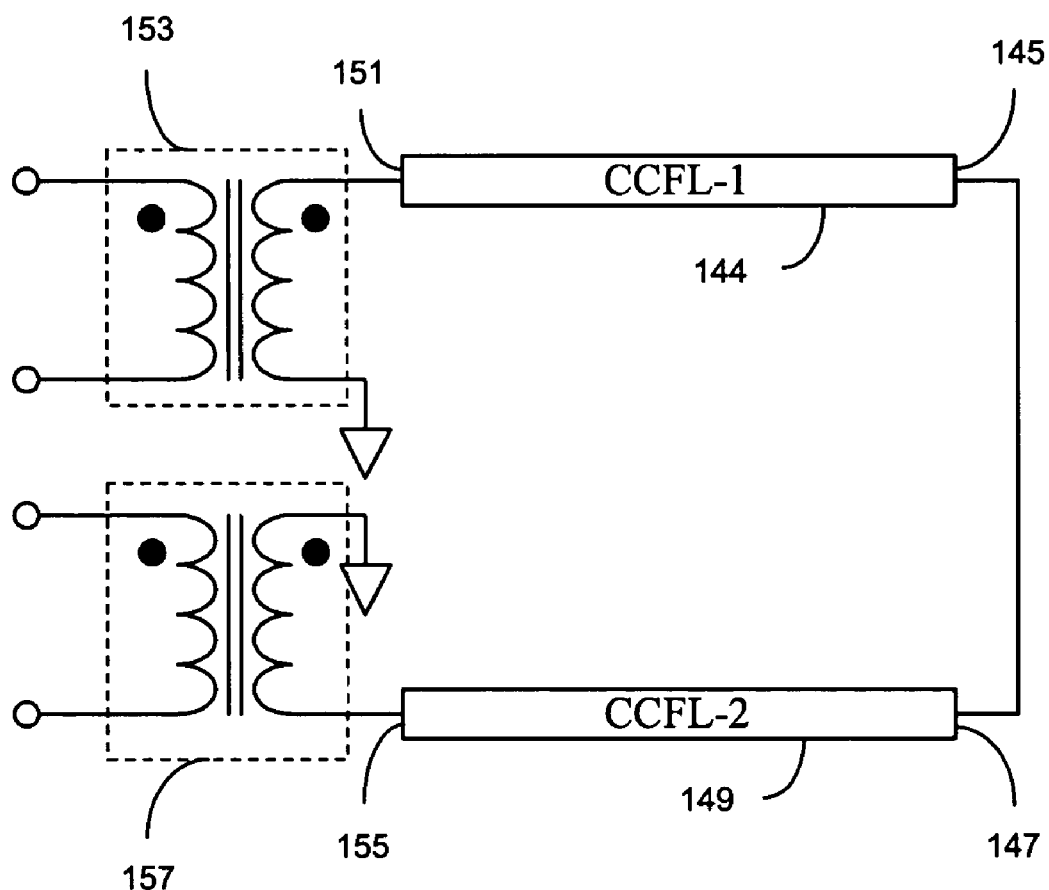

FIG. 2D illustrates another alternative CCFL floating driving device according to this embodiment of the invention. CCFL 144 has its terminal 145 connected to terminal 147 of CCFL 149. Terminal 151 of CCFL 144 is connected to transformer 153, and terminal 155 of CCFL 149 is connected to transformer 157. Transformers 153, 157 apply AC voltages to terminals 151, 155, which may be of the same magnitude and frequency, but differ in phase. For the same reason discussed above, CCFL's 144, 149 are better immune to the thermometer effect.

Figure 3A:
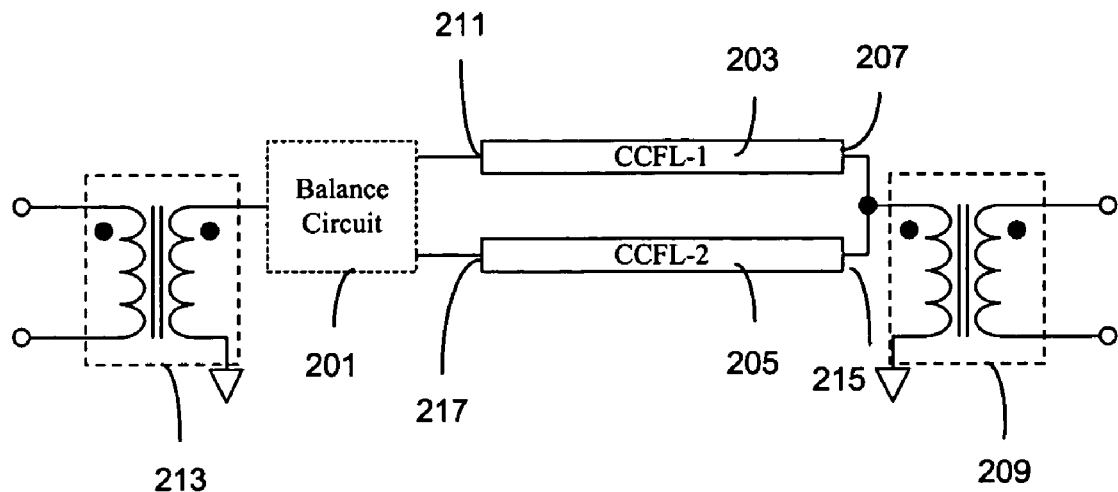
FIGS. 3A through 3D illustrate various CCFL floating driving devices, in accordance with another embodiment of the present invention.

FIG. 3A shows a CCFL floating driving device that includes a balance circuit 201 driving two CCFL's 203 and 205 coupled in parallel, in accordance with one embodiment of the invention. Each of CCFL's 203 and 205 has its opposed ends driven by separate transformers. CCFL 203 has terminal 207 driven by transformer 209 and opposed terminal 211 driven by transformer 213 via balance circuit 201. CCFL 205 has terminal 215 driven by transformer 209 and opposed terminal 217 driven by transformer 213 via balance circuit 201. Balance circuit 201 balances the AC currents applied to the terminals 211, 217 by transform 213. Various known circuit designs may be used as balance circuit 201. Various inductors and capacitors may be arranged in various configurations to provide suitable balance circuits. Due to the balance circuit 201, one transformer may be able to drive multiple CCFL's, such that a compact, and cost-efficient CCFL floating driving device can be realized.

Figure 3B:
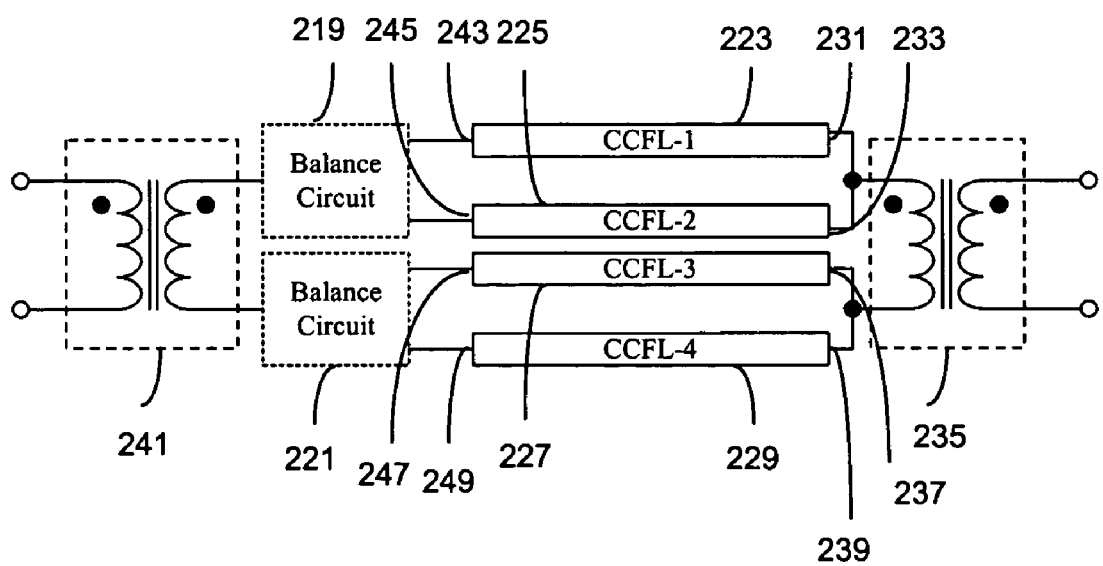

FIG. 3B shows an alternative CCFL floating driving device that includes two balance circuits 219, 221 driving four CCFL's 223, 225, 227 and 229 coupled in parallel, in accordance with the embodiment of the invention. CCFL 223 has its terminal 231 connected to terminal 233 of CCFL 225, and transformer 235. CCFL 227 has its terminal 237 connected to terminal 239 of CCFL 229, and transformer 235. Balance circuit 219 connects transformer 241 to terminal 243 of CCFL 223, and terminal 245 of CCFL 225. Balance circuit 221 connects transformer 241 to terminal 247 of CCFL 227, and terminal 249 of CCFL 229. Balance circuits 219 and 221 balance AC currents applied from transformer 241 to terminals 243, 245, 247 and 249 in such a manner that the voltages at two opposed terminals of any CCFL 223, 225, 227 or 229 may have the same frequency and magnitude, but different phase. For example, such opposed terminals may be 180 degrees out of phase in order to eliminate the thermometer effect. Due to the balance circuits 219, 221, one transformer may be able to drive multiple CCFL's, such that a compact, and cost-efficient CCFL floating driving device can be realized.

Figure 3C:
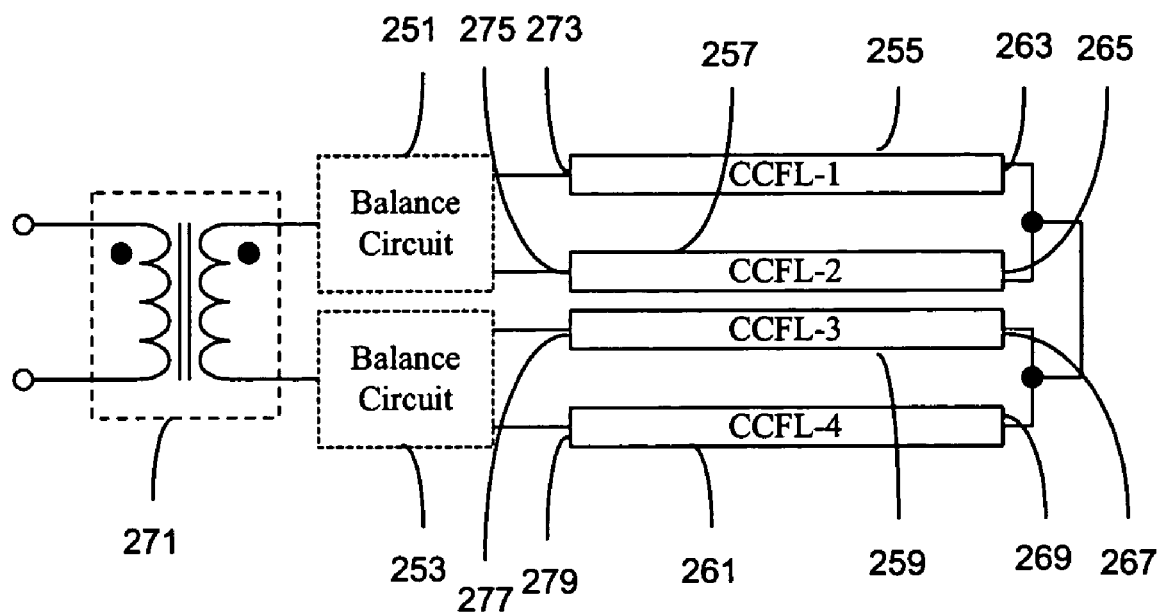

FIG. 3C shows another alternative CCFL floating driving device that includes two balance circuits 251, 253 driving four CCFL's 255, 257, 259 and 261 coupled in parallel, in accordance with the embodiment of the invention. Terminals 263, 265, 267 and 269 are connected together. Balance circuit 251 connects transformer 271 to terminal 273 of CCFL 255, and terminal 275 of CCFL 257. Balance circuit 253 connects transformer 271 to terminal 277 of CCFL 259, and terminal 279 of CCFL 261. Balance circuits 251 and 253 balance the AC currents applied from transformer 271 to terminals 273, 275, 277, and 279, such that one transformer 271 is able to drive multiple CCFL's 255, 257, 259 and 261. As such, a compact, and cost-efficient CCFL floating driving device can be realized.

Figure 3D:
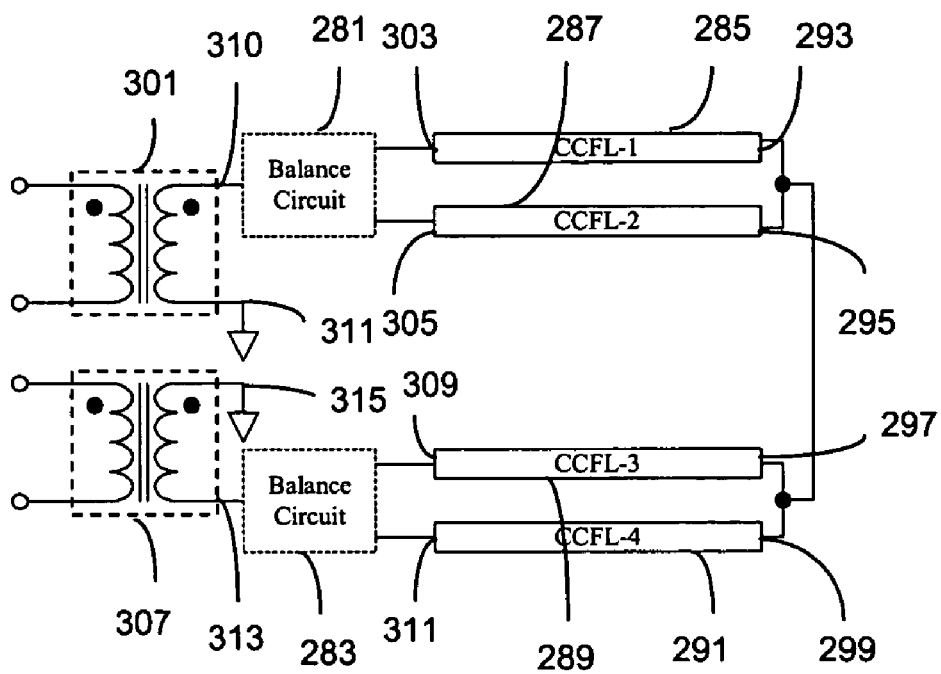

FIG. 3D shows another alternative CCFL floating driving device that includes two balance circuits 281, 283 driving four CCFL's 285, 287, 289 and 291 coupled in parallel, in accordance with the embodiment of the invention. Terminals 293, 295, 297 and 299 are connected together. Balance circuit 281 connects transformer 301 to terminal 303 of CCFL 285, and terminal 305 of CCFL 287. Balance circuit 283 connects transformer 307 to terminal 309 of CCFL 289, and terminal 311 of CCFL 291. One outlet 310 of transformer 301 is connected to balance circuit 281, and the other 311 is grounded. Likewise, one outlet 313 of transformer 307 is connected to balance circuit 283, and the other is grounded. Balances circuits 281 and 283 balance the currents applied from transformers 301 and 307 to terminals 303, 305 and 309, 311, respectively. As such, balance circuits 281 and 283 are able to drive multiple CCFL's, and a compact, and cost-efficient CCFL floating driving device can be realized.

Figure 1:
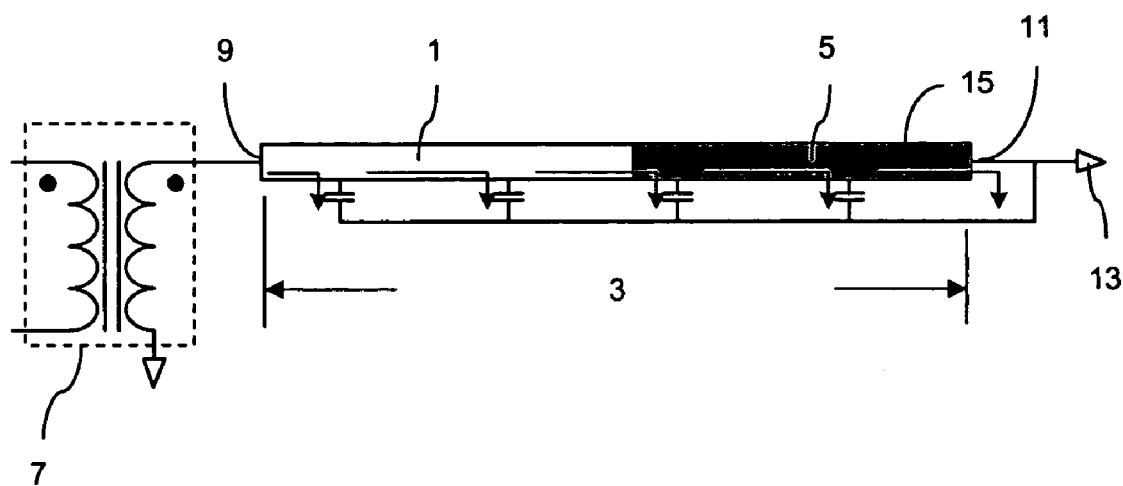
FIG. 1 illustrates a conventional CCFL driving device.
Figure 4:
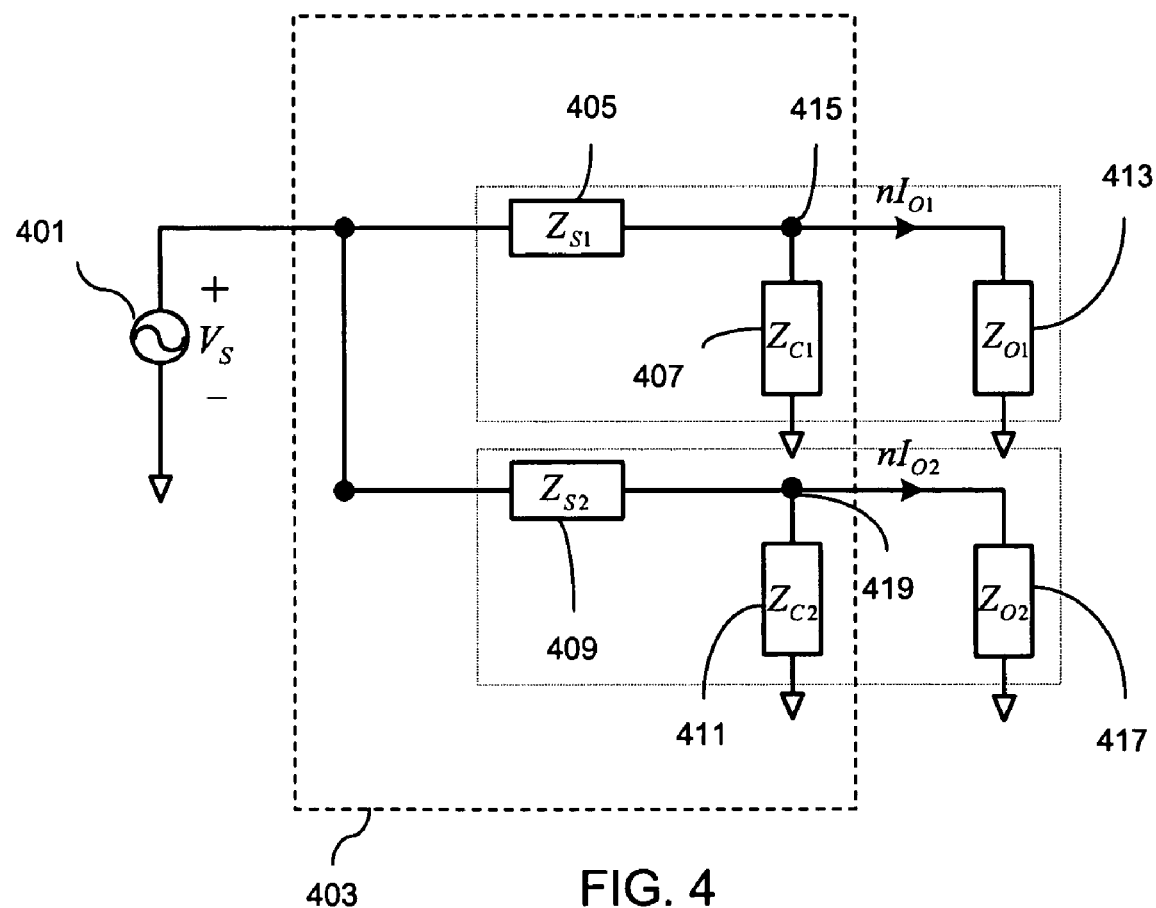
FIG. 4 illustrates a schematic drawing for introducing a mathematic model of a balance circuit that may be used in the above embodiments.

FIG. 4 illustrates a schematic drawing for introducing a mathematic model of a balance circuit, in accordance with one embodiment of the present invention. Power generator 401 outputs voltage Vs to balance circuit 403 that includes a first path constituted by inductor 405 and capacitor 407, and a second path constituted by inductor 409 and capacitor 411. CCFL 413 is connected to balance circuit 403 at node 415, and CCFL 417 is connected to balance circuit 403 at node 419. Inductors 405 and 409 have inductance impedance $Z_{S1}$ and $Z_{S2}$, respectively. Capacitors 407 and 411 have capacitance impedance $Z_{C1}$ and $Z_{C2}$, respectively. CCFL's 413 and 417 have equivalent impedance $Z_{O1}$ and $Z_{O2}$, respectively. The current $nI_{O1}$ output from balance circuit 403 to CCFL 413 can be expressed as the following equation:

$$nI_{O1} = V_s \times \frac{Z_{C1}}{Z_{S1}Z_{C1} + (Z_{S1} + Z_{C1})Z_{O1}} \quad (1)$$

Assume $Z_{S1} = -Z_{C1}$ then $nI_{O1} = \frac{V_s}{Z_{S1}}$ (2)

Further assume $Z_{S1} = Z_{S2}$, $Z_{C1} = Z_{C2}$, and $Z_{O1} = Z_{O2}$

Then $nI_{O1} = nI_{O2}$ (3)

Therefore, by adjusting the impedance values of inductors 405, 409 and capacitors 407, 411, the current outputs from balance circuit 403 to CCFL's 413 and 417 could be the same.

Figure 5A:
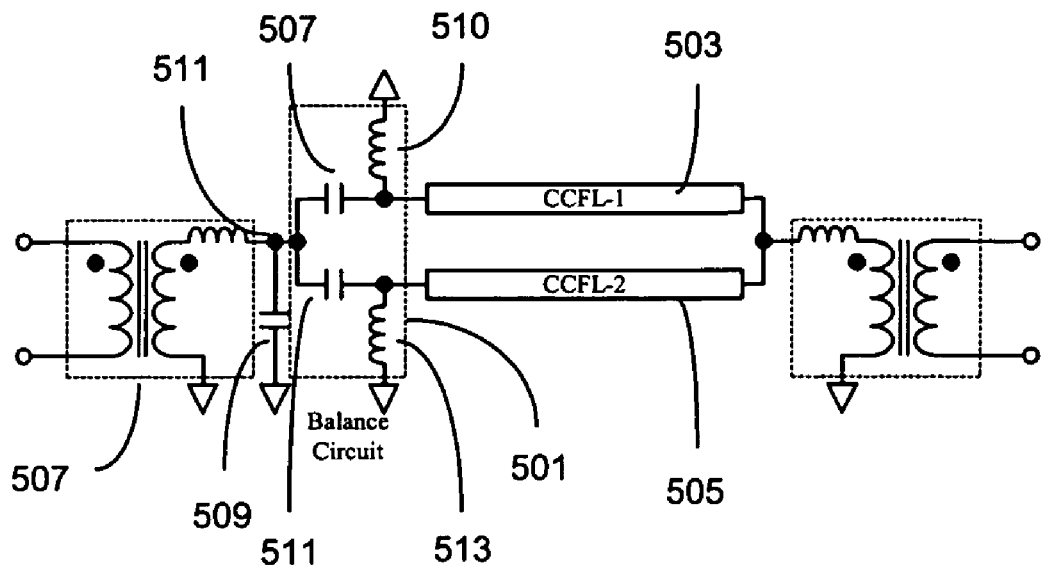
FIGS. 5A through 5F illustrate various balance circuit designs based on the mathematic model, in accordance with another embodiment of the present invention.

FIGS. 5A through 5F illustrate various alternative balance circuits based on the mathematic model introduced associated with FIG. 4, in accordance with one embodiment of the present invention. FIG. 5A shows a balance circuit 501 coupled between CCFL's 503, 505 and transformer 507. Balance circuit 501 is connected to transformer 507 through a parallel capacitor 509 at node 511. Node 511 is connected to CCFL 503 through capacitor 507 and inductor 510, and to CCFL 505 through capacitor 511 and inductor 513, respectively. As the equations discussed above, by adjusting the impedance values of capacitors 507, 511 and inductors 509, 513, balance circuit 501 would output balanced currents to CCFL's 503 and 505.

Figure 5B:
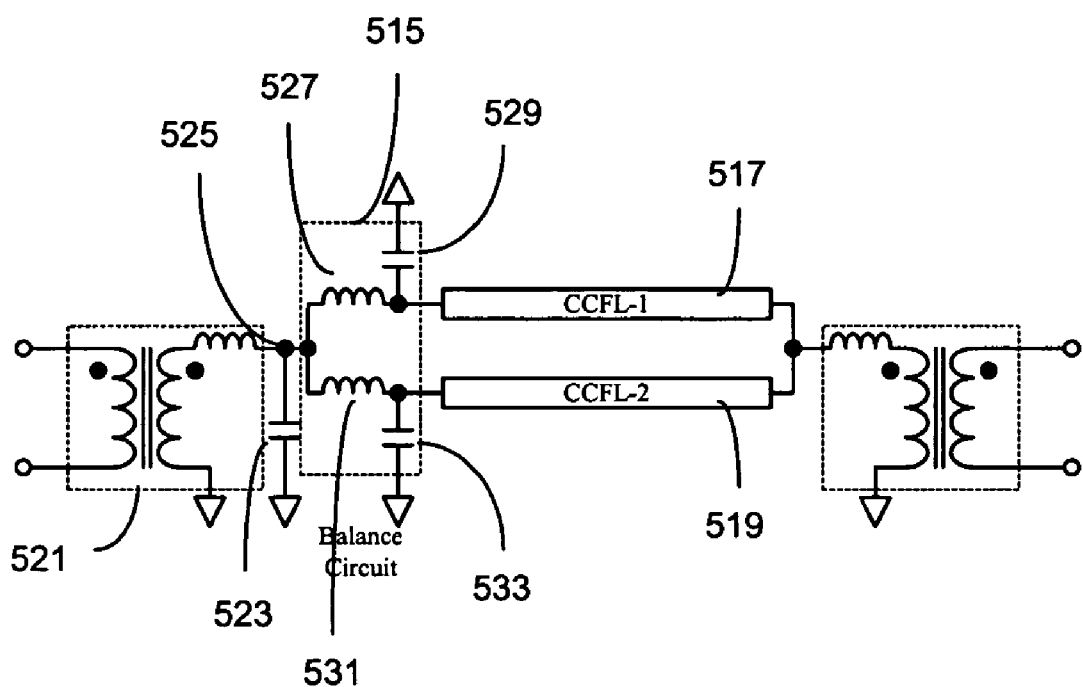

FIG. 5B shows another alternative balance circuit 515 coupled between CCFL's 517, 519 and transformer 521. Balance circuit 515 is connected to transformer 521 through a parallel capacitor 523 at node 525. Node 525 is connected to CCFL 517 through inductor 527 and capacitor 529, and to CCFL 519 through inductor 531 and capacitor 533, respectively. As the equations discussed above, by adjusting the impedance values of capacitors 529, 533 and inductors 527, 531, balance circuit 515 would output balanced currents to CCFL's 517 and 519.

Figure 5C:
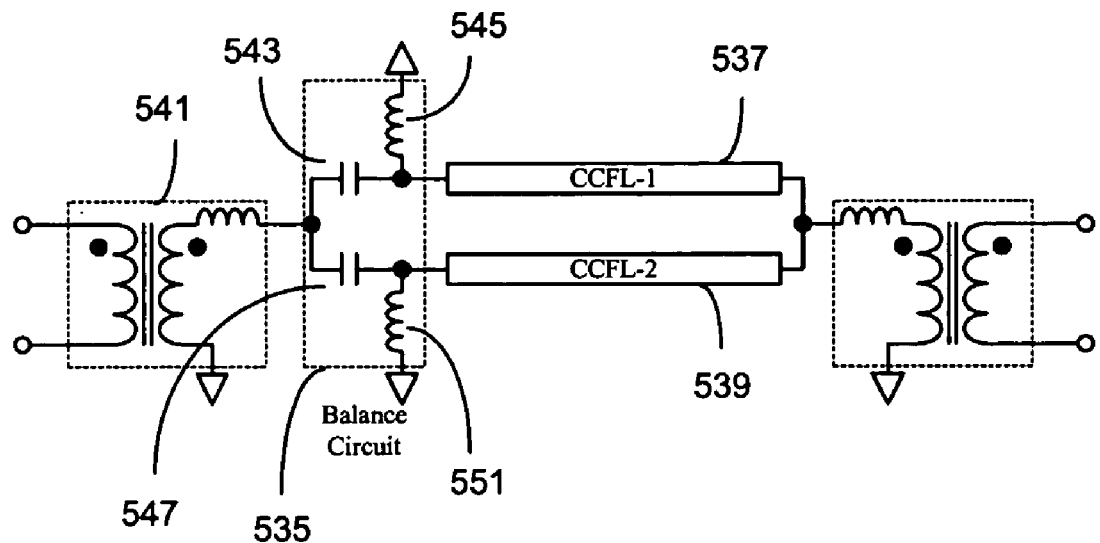

FIG. 5C shows another alternative balance circuit 535 coupled between CCFL's 537, 539 and transformer 541, similar to the balance circuit 501 shown in FIG. 5A, except that the parallel capacitor 509 is eliminated. Transformer 541 is connected to CCFL 537 through capacitor 543 and inductor 545, and to CCFL 539 through capacitor 547 and inductor 551, respectively. As the equations discussed above, by adjusting the impedance values of capacitors 543, 547 and inductors 545, 551, balance circuit 535 would output balanced currents to CCFL's 537 and 539.

Figure 5D:
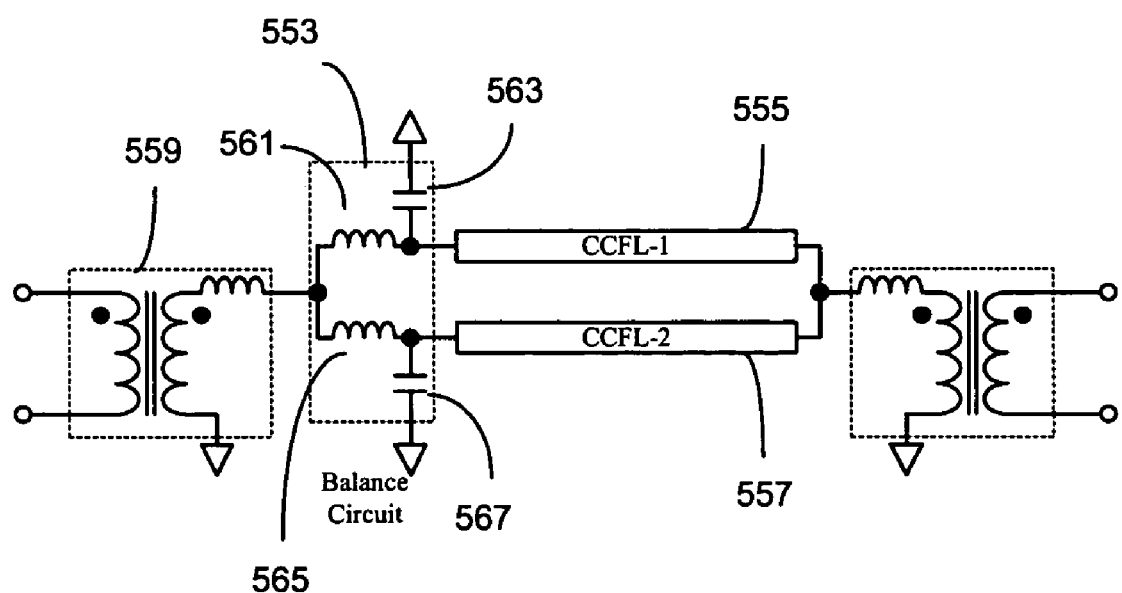

FIG. 5D shows another alternative balance circuit 553 coupled between CCFL's 555, 557 and transformer 559, similar to the balance circuit 515 shown in FIG. 5B, except that the parallel capacitor 523 is eliminated. Transformer 559 is connected to CCFL 555 through inductor 561 and capacitor 563, and to CCFL 557 through inductor 565 and capacitor 567, respectively. As the equations discussed above, by adjusting the impedance values of capacitors 563, 567 and inductors 561, 565, balance circuit 553 would output balanced currents to CCFL's 555 and 557.

Figure 5E:
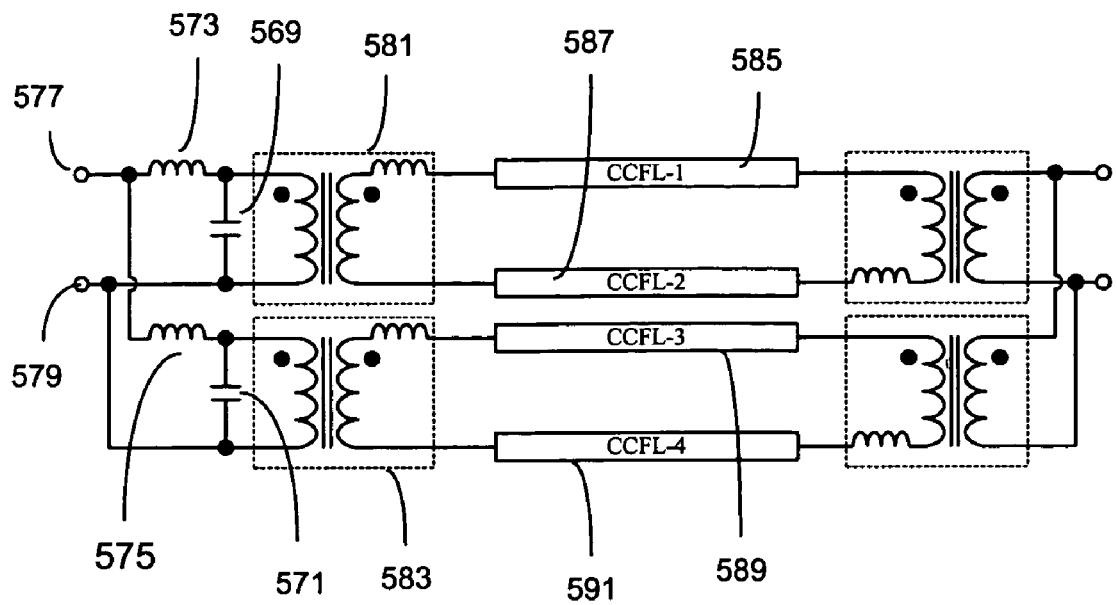

FIG. 5E shows an equivalent balance circuit, constituted by capacitors 569, 571 and inductors 573, 575, coupled between power input nodes 577, 579 and transformers 581, 583, which are further connected to CCFL's 585, 587, 589 and 591. As the equations discussed above, by adjusting the impedance values of capacitors 569, 571 and inductors 573, 575, transformers 581, 583 would output balanced currents to CCFL's 585, 587, 589 and 591.

Figure 5F:
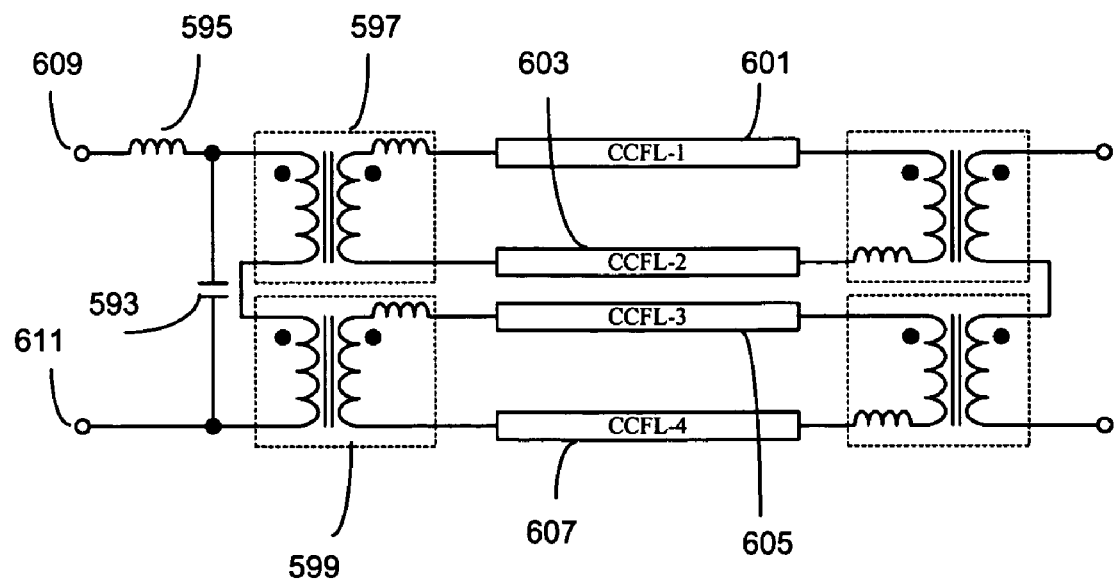

FIG. 5F shows an equivalent balance circuit, constituted by capacitor 593 and inductors 595, coupled between power input nodes 609, 611 and transformers 597, 599, which are further connected to CCFL's 601, 603, 605 and 607. As the equations discussed above, by adjusting the impedance values of capacitor 593 and inductor 595, transformers 597, 599 would output balanced currents to CCFL's 601, 603, 605 and 607.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A floating driving device, comprising
a plurality of illumination units, each of which has a first terminal and a second terminal, and the second terminals of the plurality of illumination units are electrically coupled together at a common voltage node;
a first driver electrically coupled to the first terminals of a first pair of illumination units of the plurality of illumination units, for applying AC voltages to the first terminals, wherein a first output end of the first driver is coupled to a first one of the first terminals of the first pair of illumination units and a second output end of the first driver is coupled to a second one of the first terminals of the first pair of illumination units;
a second driver electrically coupled to the first terminals of a second pair of illumination units of the plurality of illumination units, for applying AC voltages to the first terminals, wherein a first output end of the second driver is coupled to a first one of the first terminals of the second pair of illumination units and a second output end of the second driver is coupled to a second one of the first terminals of the second pair of illumination units;

a first balance circuit connected to the first driver; and a second balance circuit connected to the second driver, wherein said first and second balance circuits having impedance that is adjusted to generate balancing output signals from the first driver and the second driver to the plurality of the illumination units, wherein the first driver is coupled between the plurality of illumination units and the first balance circuit and the second driver is coupled between the plurality of illumination units and the second balance circuit.

2. The floating driving device of claim 1, wherein the illumination units are cold cathode florescent lamps.

3. The floating driving device of claim 1, wherein the first driver unit and the second driver unit are transformers.

4. A floating driving device for illumination comprising:
a plurality of illumination units, each of which has a first terminal and a second terminal;
a first driver, electrically coupled to the first terminals of the plurality of illumination units, for applying AC voltages to the first terminals;
a second driver, electrically coupled to the second terminals of the plurality of illumination units, for applying AC voltages to the second terminals in a manner that the AC voltages at the first terminal and the second terminal are out of phase; and
a balance circuit, connected to the first driver, wherein the balance circuit comprises a first capacitor coupled to a first inductor and a second capacitor coupled to a second inductor, a first node between the first capacitor and the first inductor is coupled to a first one of the first terminals, and a second node between the second capacitor and second inductor is coupled to a second one of the first terminals.

5. The floating driving device of claim 4, wherein the balance circuit is coupled between the plurality of illumination units and the first driver.

6. The floating driving device of claim 5, wherein the balance circuit is connected to the first driver through a parallel capacitor.

7. The floating driving device of claim 5, wherein the first capacitor and the second capacitor are connected, in parallel, to the first driver.

8. The floating driving device of claim 7, wherein the first inductor and the second inductor connect the first capacitor and the second capacitor to the plurality of illumination units, respectively.

9. The floating driving device of claim 5, wherein the first inductor and the second inductor are connected, in parallel, to the first driver.

10. The floating driving device of claim 9, wherein the first capacitor and the second capacitor connect the first inductor and the second inductor to the plurality of illumination units, respectively.

11. The floating driving device of claim 4, wherein at least one of the illumination units is a cold cathode florescent lamp.

12. The floating driving device of claim 4, wherein the first driver and the second driver are transformers.

13. The floating driving device of claim 4, wherein the AC voltages at the first terminals and the second terminals are 180 degrees out of phase.

14. The floating driving device of claim 13, wherein the AC voltages at the first terminals and the second terminals have the same magnitude and frequency.

15. The floating driving device of claim 4, wherein the illumination units are cold cathode florescent lamps.

16. A floating driving device for illumination comprising:
a plurality of illumination units, each of which has a first terminal and a second terminal;
a first driver, electrically coupled to the first terminals of the plurality of illumination units, for applying AC voltages to the first terminals;
a second driver, electrically coupled to the second terminals of the plurality of illumination units, for applying AC voltages to the second terminals in a manner that the AC voltages at the first terminal and the second terminal are out of phase; and
a balance circuit, connected to the first driver, having impedance that is adjusted to generate balancing output signals to the plurality of illumination units, wherein the first driver is coupled between the plurality of illumination units and the balance circuit.

17. The floating driving device of claim 16, wherein the balance circuit comprises an inductor and a capacitor, the capacitor being coupled between the first driver and the inductor.

18. The floating driving device of claim 16, wherein the balance circuit comprises a first inductor and a second inductor coupled to the first driver in parallel.

19. The floating driving device of claim 18, wherein the balance circuit further comprises a first capacitor and a second capacitor coupled between the first driver and the first inductor and the second inductor, respectively.

* * * * *